Feb. 22, 1955
J. L. MURRAY
2,702,571
MAGNETICALLY ACTUATED FOOD STIRRING DEVICE
Filed Oct. 4, 1949
2 Sheets-Sheet 2
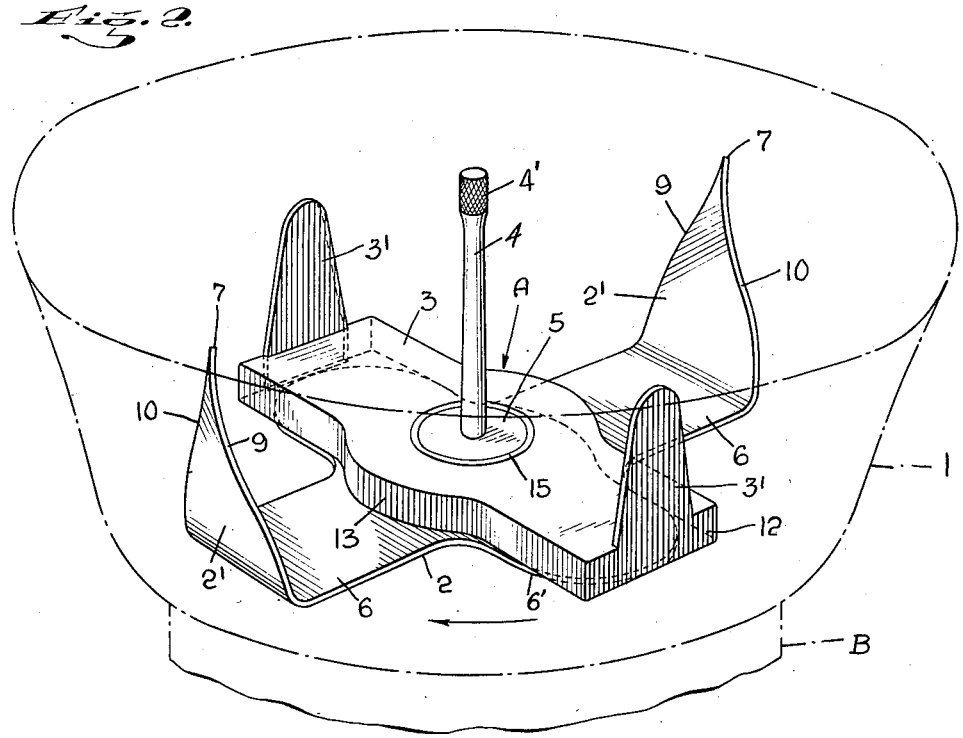
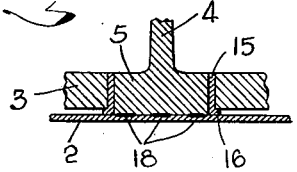
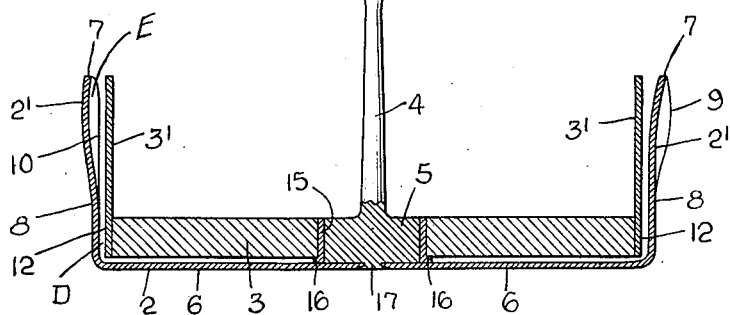
INVENTOR
JEROME L. MURRAY
BY
ATTORNEYS

# United States Patent Office 2,702,571
Patented Feb. 22, 1955

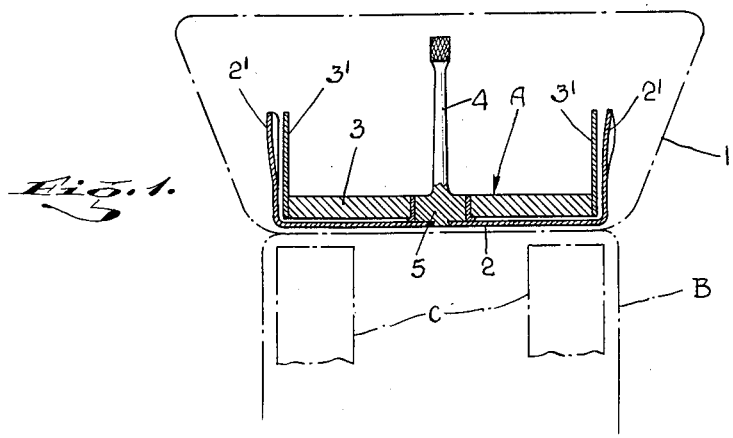
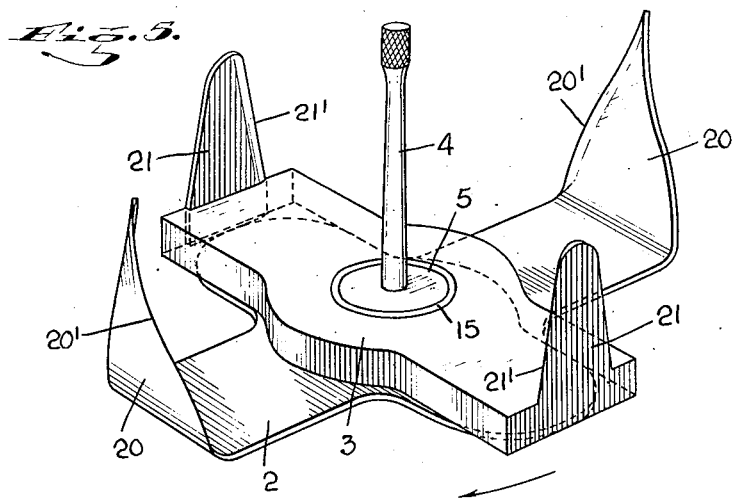
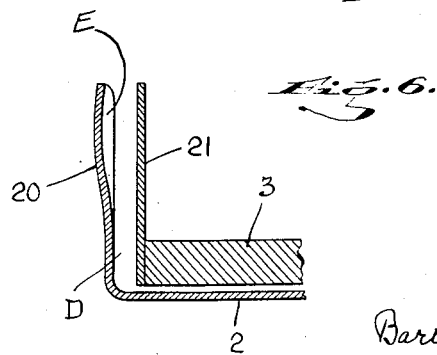

2,702,571

MAGNETICALLY ACTUATED FOOD STIRRING DEVICE

Jerome L. Murray, New York, N. Y., assignor to Pollard & Johnston, New York, N. Y., a firm composed of Albert C. Johnston, Charles P. Pollard, D. Verner Smythe, and Donald W. Robertson Application October 4, 1949, Serial No. 119,507

3 Claims. (Cl. 146—68)

This invention relates to kitchen appliances and particularly to devices for preparing food products.

In my application for Letters Patent, Serial No. 771,176, filed August 29, 1947, now Patent No. 2,655,354, issued October 13, 1953, I have set forth novel and improved means for preparing food products in the kitchen.

The present invention relates to improvements upon certain of the devices shown in said application.

For a better understanding of the invention reference may be had to the accompanying drawings forming a part of this application, wherein:

Fig. 1 is a schematic view illustrating one embodiment of the invention;

Fig. 2 is a perspective view thereof;

Fig. 3 is an enlarged sectional view therethrough;

Fig. 4 illustrates another embodiment;

Fig. 5 is a perspective view of another embodiment; and

Fig. 6 is another view thereof.

Referring to Fig. 1 of the drawings, I have illustrated my invention as applied to the mixing of dough and other food products contained in a bowl 1. A food stirrer or agitator A embodying the invention is loosely disposed on the bottom of the bowl 1. It is magnetically driven by a power unit shown in dotted lines and designated B. This power unit comprises a driving magnet having pole pieces C projecting to a position in proximity to the top of the power unit B which supports the bowl or other container 1. This power unit B may be the power unit shown in my application, Serial No. 771,176, now Patent No. 2,655,354, or it may be of any other suitable type having magnetic drive means for the food stirrer or agitator A.

The means A is a unitary structure adapted to be handled as a unit, namely it may be positioned on the bottom of the container 1 as a unit and likewise it may be readily lifted from the container as a unit.

This unit comprises a supporting frame member or element 2 and a relatively rotating driven member or element 3. The driven element 3 is elongated in form and is provided with at least one pair of upwardly projecting wings or blades 3' which are removed from the center of rotation of the element 3. In the particular embodiment shown the relatively rotating element 3 is provided with a pair of wings or blades 3' disposed at or adjacent the outer ends of the element. The frame supporting element 2 has projecting upwardly therefrom a pair of wings or blades 2' for cooperating with the wings or blades 3' in the food preparing operation. For this purpose the wings or blades on the two elements are spaced from each other and the elements are aligned any suitable distance D.

The element 2 is provided with a lifting handle or stem 4 which may readily be gripped by the fingers to either position the stirrer or agitator unit on the bottom of the bowl or container 1 or to lift the same from the bowl. The stem or handle 4 is provided at its lower end with a circular enlarged bearing portion 5 which may be rigidly fastened to the element 2 in any suitable manner. The element 3 is journaled about this bearing 5 for rotation relatively to the element 2.

The supporting frame element 2 is of any suitable non-magnetizable material. Preferably it is of non-magnetic stainless steel. The main body of the element 3 on the other hand is of a readily magnetizable metal as, for example, cold rolled steel so as to be driven by the rotating magnetic poles C which rotate in a plane at right angles to the drawing in Fig. 1. The blades 3' may be magnetic or non-magnetic, preferably the latter.

Referring more particularly to Figs. 2 and 3, the supporting frame element 2 is formed of sheet metal of a shape to fit stably on to the bottom of the container 1. It has extensions 6 carrying the blades 2' and in the particular embodiment shown these blades are formed integrally with the extensions 6 of the element 2. The element 2 has other and shorter extensions 6' at right angles to the extensions 6. These blades 2' in the particular embodiment shown extend generally vertically and are tapered in width in an upward direction to their uppermost points or ends 7. The upper parts of these wings or blades 2' are twisted about their center lines to form curved portions, the curved part of each wing or blade beginning roughly at the points 8 disposed about one-third of the height or length of the blades. The stirring or agitating element 3 rotates clockwise as indicated by the arrow and the upper parts of the blades 2' are twisted or formed so that their front edges 9 are disposed slightly outward with respect to the advancing wings or blades 3' of the stirring and agitating element and with their rear edges 10 disposed slightly inwardly with respect to the front edges 9. The upper portions of the wings or blades 2' thereby present to the advancing blades or wings 3' a gradually decreasing angle indicated at E.

In the particular embodiment shown the element 3 comprises a bar having straight end edges 12 and a central enlarged part 13 in the vicinity of the bearing element 5. The wings or blades 3' of the element 3 may be integrally formed with the main body of the element 3 or they may be separate elements mortised into the ends 12 of the element to form a flush end surface. These wings or blades 3' are preferably flat vertical members disposed in planes parallel to the axis of rotation which is disposed centrally of the bearing 5.

In the particular embodiment shown the bearing member 5 is provided with an annular bushing 15 of suitable bearing material and the element 3 is provided with a central cylindrical opening the cylindrical surface of which rotates about the outer surface of the annular bushing 15. The bushing 15 is provided on its lower end with a shoulder 16 upon which rests the stirring and agitating element 3, the weight of the latter bearing upon this annular shoulder 16. This bushing 15 may be of any suitable material such for example as Graphitar.

The supporting stem or handle 4 and the bearing portion 5 may be fastened to the frame member 2 in any suitable manner and in the embodiment shown in Fig. 3 the member 4, 5 is provided with a centrally disposed riveting part 17 which is riveted in an opening formed in the frame member 2 with the under surface of 17 flush with the bottom surface of the frame member or element 2.

In the embodiment of Fig. 4 the bearing element 5 is spot-welded to the frame element or member 2 at a number of points indicated generally at 18.

I have found that the stirrer or agitator unit of Figs. 1 to 4 is particularly efficient in the working and mixing of dough and other cooking mixtures and food products. This efficiency in the mixing and preparing operation I attribute to the rotating stirring and agitating element 3 of the particular structure shown wherein the advancing edges of the main body portion of the element 3 and also the advancing blunt edges of the wings or blades 3' cut through the dough or other food product to be mixed in a manner to obtain rapid and efficient mixing. I also attribute this efficiency in large part to the chopping and shearing action of the blades or wings 3' as they pass in close proximity to the relatively stationary blades or wings 2' and this chopping and shearing action is further enhanced by the propeller-like curvatures of the upper portions of the blades or wings 2' which present a gradually decreasing angle to the advancing blades or wings 3' as the latter pass the former. These advantages are obtained without impairing the efficiency of the magnetic circuit between the driving magnetic poles C and the magnetic element 3. With this stirring and agitating unit it is a simple matter for the housewife to insert it in the bowl or container 1 or to lift it out by simply engaging with the fingers the knurled enlarged portion 4' at the upper end of the handle.

As above indicated the spacing D of the blades when they are in proximity to each other may be varied to suit particular conditions. Generally speaking a smaller spacing is preferable for the lighter doughs and a larger spacing is preferable for the heavier doughs but a unit built with a spacing suitable for medium mixtures will function with adequate efficiency for both the lighter and heavier doughs or mixtures.

In the embodiments of Figs. 5 and 6 I have shown a structure which is particularly adapted to the chopping of vegetables and the like. In this embodiment the front edges 20' of the blades or wings 20 are formed with knife-like edges instead of the blunt edges shown in Fig. 2, and the leading edges 21' of the blades or wings 21 are likewise formed of knife edges. In this embodiment also the spacing D of the blades is relatively larger than that shown in Fig. 3 for food mixing.

In operation the dough and the like being mixed or the vegetables being chopped tend to be thrown out from the center radially of the bowl or container by the operation of the unit. In the embodiment of Figs. 1 to 4 the dough or other food product being beaten or mixed is therefore chopped and sheared by the blades disposed outwardly from the center of the unit. Similarly with respect to vegetables, the meeting edges of the blades being formed knife-like the vegetables are efficiently chopped and comminuted by the embodiment of Figs. 5 and 6.

In both embodiments the element 3 is the principal rotating element, although the supporting element 2 since it is loosely supported on the bottom of the container, may be dragged along at a very slow rate of speed.

I claim:

1. In combination with a container having a substantially uniplanar floor, an elongated base member on said floor and being provided with terminal upstanding blades, an elongated driven element pivotally mounted centrally of and supported on said base member, said driven element being of less length than the distance between said blades and having terminal upstanding wings or blades, said driven element being of magnetic material whereby said driven element may be rotated by electro-magnetic motive power.

2. In combination with a container having a substantially uniplanar floor, an elongated base member on said floor and being provided with terminal upstanding blades, an elongated driven element pivotally mounted centrally of and supported on said base member, said driven element being of less length than the distance between said blades and having terminal upstanding wings or blades, said driven element being of magnetic material whereby said driven element may be rotated by electro-magnetic motive power, the blades of one of said elements having a leading portion twisted away from the blades of the other element directing the product toward the other blades.

3. In combination with a container having a substantially uniplanar floor, an elongated base member on said floor and being provided with terminal upstanding blades, an elongated driven element pivotally mounted centrally of and supported on said base member, said driven element being of less length than the distance between said blades and having terminal upstanding wings or blades, said driven element being of magnetic material whereby said driven element may be rotated by electro-magnetic motive power, the blades of one of said elements having a leading portion twisted away from the blades of the other element directing the product toward the other blades, and an enlarged circular bearing surface on one of said elements guiding a journal on the other of said elements.

References Cited in the file of this patent

UNITED STATES PATENTS

| | | |
|---|---|---|
| 776,383 | Bryan | Nov. 29, 1904 |
| 1,420,774 | Stainbrook | June 27, 1922 |
| 1,827,608 | Pickard | Oct. 13, 1931 |
| 2,028,595 | Flegel | Jan. 21, 1936 |
| 2,109,501 | Osius | Mar. 1, 1939 |
| 2,350,534 | Rosinger | June 6, 1944 |
| 2,461,720 | Cawood | Feb. 15, 1949 |
| 2,466,468 | Neal | Apr. 5, 1949 |
| 2,518,758 | Cook | Aug. 15, 1950 |
| 2,546,949 | Morrison | Mar. 27, 1951 |
| 2,549,121 | Osterheld | Apr. 17, 1951 |
| 2,655,354 | Murray | Oct. 13, 1953 |

FOREIGN PATENTS

| | | |
|---|---|---|
| 927,678 | France | May 5, 1947 |